United States Patent [19]

Tadokoro et al.

[11] Patent Number: 4,562,803
[45] Date of Patent: * Jan. 7, 1986

[54] INTAKE SYSTEM FOR ROTARY PISTON ENGINE

[75] Inventors: Tomoo Tadokoro; Haruo Okimoto; Hideo Shiraishi; Toshimichi Akagi, all of Hiroshima, Japan

[73] Assignee: Mazda Motor Corporation, Hiroshima, Japan

[*] Notice: The portion of the term of this patent subsequent to Jan. 7, 2003 has been disclaimed.

[21] Appl. No.: 556,941

[22] Filed: Dec. 1, 1983

[30] Foreign Application Priority Data

Dec. 2, 1982 [JP] Japan .............................. 57-212428

[51] Int. Cl.4 ............................................ F02B 53/04
[52] U.S. Cl. ..................................... 123/216; 123/242
[58] Field of Search .................... 123/216, 242, 52 M, 123/219

[56] References Cited

U.S. PATENT DOCUMENTS

| 3,491,733 | 1/1970 | Soubis | 123/52 M |
| 4,388,907 | 6/1983 | Sugo et al. | 123/478 |
| 4,425,883 | 1/1984 | Tadokoro et al. | 123/216 |

Primary Examiner—Michael Koczo
Attorney, Agent, or Firm—Fleit, Jacobson, Cohn & Price

[57] ABSTRACT

A two rotor type rotary piston engine includes an intake system comprised of individual light load intake ports and heavy load intake ports provided in at least one of the intermediate and side housings to open to the respective rotor cavities and adapted to be cyclically closed by the rotors as the rotor rotate, an intake passage including a throttle valve and individual light load and heavy load passages leading respectively to the light load and heavy load intake ports. The light load passages are communicated with each other by a communicating passage downstream of the throttle valve and the heavy load passages are also communicated each other by a further communication passage. The intake port timings and the passage lengths are so determined that pressure resonance effects can be obtained at both medium and high speed engine operations.

7 Claims, 5 Drawing Figures

INTAKE SYSTEM FOR ROTARY PISTON ENGINE

The present invention relates to rotary piston engines, and more particularly to intake systems for rotary piston engines. More specifically, the present invention pertains to side port type intake systems for two-rotor rotary piston engines.

In general, a rotary piston engine includes a casing comprised of a rotor housing having an inner wall of trochoidal configuration, a pair of side housings secured to the opposite sides of the rotor housing to define a rotor cavity in the rotor housings. A rotor of substantially polygonal configuration is disposed in the rotor cavities and has flanks which define, with the inner wall of the rotor housing, working chambers having volumes which are cyclically changed as the rotor rotates. The rotor housing is generally formed with an exhaust port whereas the side housings are formed with intake ports so that intake, compression, combustion, expansion and exhaust cycles are conducted sequentially in each of the working chambers.

In this type of rotary piston engines, it has been proposed to utilize pulsations in the intake passage so that effective feed of intake gas can be accomplished throughout a wide range of the engine operating speed. For example, the U.S. Pat. No. 3,491,733 issued on Jan. 27, 1970 to Soubis et al. teaches to separate the intake passage into two passages of different lengths and connect there separated passages to two separated intake ports having different port closing timings so that the two passages and the two intake ports are used under a high speed engine operation whereas only one passage and only one intake port having earlier port closing timing are used under a low speed engine operation. With this arrangement, it is possible to feed the intake change with resonance under a wide engine operating speed.

It should however be noted that the U.S. patent relates to a single rotor type rotary piston engine and besides there is no precise teaching as to how the pulsations in the passages are utilized. Further, the U.S. patent discloses a so-called peripheral port type rotary piston engine having the intake ports provided in the rotor housing. This type of engine is considered disadvantageous in that the intake ports are overlapped with the exhaust port so that the exhaust gas is blown under its own pressure into the intake working chamber decreasing the intake gas charge. In engines of recent years, there is a tendency that the exhaust gas pressure is increased due to facilities for suppressing engine noise and for purifying engine exhaust gas. In engines having turbo-superchargers, the exhaust gas pressure is further increased. Therefore, the peripheral port type intake system is not satisfactory to increase the intake charge utilizing the resonance effect.

It is therefore an object of the present invention to provide an intake system for two-rotor type rotary piston engines in which pulsations in intake passages can effectively be utilized to increase the intake gas charge.

Another object of the present invention is to provide a side port type intake system for two-rotor type rotary piston engines in which pulsations in the intake passage for one rotor cavity are utilized to increase the charge in the other rotor cavity.

A further object of the present invention is to provide a side port type intake system for two-rotor type rotary piston engines which can effectively produce a pressure resonance effect in two different engine operating speed ranges to obtain an increased intake charge.

The present invention is based on the findings that a compression wave is produced in the vicinity of the intake port when the port is opened under the influence of the pressure of the residual combustion gas and that there is a tendency in recent engines that the compression wave is intensified due to the increase in the exhaust gas pressure. Thus, according to the present invention, the compression wave produced in one intake passage leading to one rotor cavity is transmitted through the other intake passage leading to the other rotor cavity to the intake port just before the other intake port is closed under a specific engine speed. More specifically, the casing is formed with light load and heavy load intake ports opening to each rotor cavity and separate intake passages are provided for the respective intake ports. The intake passages leading to the respective light load intake ports are communicated with each other so as to accomplish the aforementioned compression wave transmittal between the light load intake ports under a specific engine speed range, whereas the intake passages leading to the respective heavy load intake ports are communicated with each other to accomplish the similar effect between the heavy load intake ports under a second specific engine speed range.

According to the present invention, there is therefore provided a two rotor type rotary piston engine including a casing comprised of a pair of rotor housings each having an inner wall of trochoidal configuration, an intermediate housing located between the rotor housings and a pair of side housings secured to outer sides of the respective rotor housings to define rotor cavities in the respective rotor housings, a pair of substantially polygonal rotors disposed in the respective rotor cavities with apex portions in sliding engagement with the inner walls of the respective rotor housings to define working chambers of cyclically variable volumes, said rotors being carried by eccentric shaft means so that said rotors are rotated with 180° phase difference in terms of angle of rotation of said eccentric shaft means, intake means including first intake port means provided in at least one of said intermediate and side housings to open to each of the rotor cavities and adapted to be cyclically closed by said rotor as the rotor rotates, second intake port means provided in at least one of said intermediate and side housings to open to each of the rotor cavities and adapted to be cyclically closed by said rotor as the rotor rotates, intake passage means including throttle valve means, said intake passage means further including first individual passage means leading respectively to said first intake port means and communicated with each other by first communicating passage means and second individual passage means leading respectively to said second intake port means and communicated with each other by second communicating passage means, said first intake port means and said first individual and communicating passage means having respectively port timings and passage lengths which are so determined that a compression wave produced in one of said first individual passage means in opening timing of one of said first intake port means is transmitted to the other of said first intake port means just before said other first intake port means is closed to obtain an additional charge under a first engine speed, said second intake port means and said second individual and communicating passage means having respectively port timings and passage lengths which are so determined that a compression wave produced in one of said second individual passage means in opening timing of one of said second intake port means is transmitted to the other of said second intake port means just before said other second intake port means is closed to obtain an additional charge under a second engine speed which is different from said first engine speed by more than 1000 rpm. In a preferable aspect of the present invention, the communication passage means includes surging chamber means having an increased volume. The intake port means may be provided in both side housings as well as the intermediate housing.

The throttle valve means may include first throttle valve means for controlling intake gas flow to said first individual passage means and second throttle valve means for controlling intake gas flow to said second individual passage means, the second throttle valve means being adapted to be opened after the first throttle valve means is substantially fully opened. In this arrangement, the second engine speed range should be higher than the first engine speed range. Preferably, the first and second communication passage means are located downstream of the throttle valve means and said first engine speed is determined between 3500 and 5000 rpm whereas said second engine speed is determined between 5000 and 7000 rpm. Further, it is preferred that the first intake port means has an opening period of 230° to 290° in terms of angle of rotation of the eccentric shaft means, the second port means having an opening period of 270° to 320° in terms of angle of rotation of the eccentric shaft means, the first intake and communicating passage means having an overall length of 0.34 to 1.47 m, the second intake and communicating passage means having an overall length of 0.57 to 1.37 m.

According to the present invention, the aforementioned engine speed range of 5000 to 7000 rpm is determined in view of the fact that most of the engines are designed to produce the highest output power in this speed range so that the most significant improvement can be obtained in respect of increase in the intake charge and the output power. The speed range of 3500 to 5000 rpm is determined in view of the fact that the maximum output torque is produced generally in this speed range and that the pressure resonance effect cannot effectively be obtained in a lower speed range. Since the pressure resonance effect can be obtained in a speed range of 1000 rpm each side of the first or second engine speed, it is recommendable to make the first and second engine speed different by 1000 rpm or more to obtain an increase in the engine output throughout a wide engine operating range. The second intake port opening period should preferably be more than 270° in term of the angle of rotation of the eccentric shaft because this value is the period between the intake top dead center and the intake bottom dead center and the intake action can be effected at least in this period. It should however be noted that, in choosing the intake port opening period of 270°, the opening and closing timings of the intake port should not be exactly at the top and bottom dead centers but preferably be retarded therefrom taking into account the possible delay of the intake gas flow due to the inertia of the intake gas. The upper limit value 320° of the second intake port opening period is determined from the viewpoint of avoiding two adjacent working chambers being communicated each other through the second intake port. When the first intake port is intended to be used mostly under a low speed range in which the intake charge is small and the inertia of the intake gas is also small, it is required to close the port earlier than 50° after bottom dead center in order to avoid blow back of the intake gas but it is also required to take the opening period of at least 230° in order to ensure an adequate intake charge. Thus, it is recommendable that the first intake port has the opening timing of 230° to 290° as previously described. In actual practice, the working chambers are separated by side seals provided on side surface of the rotor so that the actual intake port opening period is increased by approximately 40° than the value calculated geometrically based on the configuration of the rotor. Therefore, the intake port opening period may be determined taking the positions of the side seals into account. However, in determining the above upper limit value, it is not necessary to take into account the positions of side seals because in high and medium engine speed range which the present invention is concerned with the small clearance formed between the side surface of the rotor and the side or intermediate housing does not have any influence.

It is advisable to locate the communication passage downstream of the throttle valve because otherwise the throttle valve will produce a resistance to the propagation of the compression wave. The overall length of the communication and individual passages is obtained by the formula $$L = (\theta - 180 - \theta_o) \times 60/360N \times C \quad \ldots (1)$$

where:
L is the overall length;
$\theta$ is the intake port opening period;
N is the engine speed;
C is the sonic speed;
$\theta_o$ is the inactive period which is the sum of the period between the opening timing of the intake port and generation of the compression wave, and the period required for accomplishing a satisfactory charge increase before the full close of the intake port, and this inactive period is approximately 20°.

It will thus be understood that the term $(\theta - 180 - \theta_o)$ represents the angle of rotation of the eccentric shaft corresponding to the period from generation of the compression wave at one intake port to the time at which the compression wave reaches the other intake port.

The term 60/360N represents the time period required for one revolution of the engine. Since the sonic speed C is 343 m/sec. at the ambient temperature of 20° C., the length L becomes 0.57 to 1.37 m for the engine speed N of 5000 to 7000 rpm and 0.34 to 1.47 m for the engine speed N of 3500 to 5000 rpm. In the equation (1), the influence of the intake air flow on the propagation of the compression wave is neglected because the intake flow speed is small in relation to the sonic speed.

The above and other objects and features of the present invention will become apparent from the following descriptions of preferred embodiments taking reference to the accompanying drawings, in which.

Figure 1:
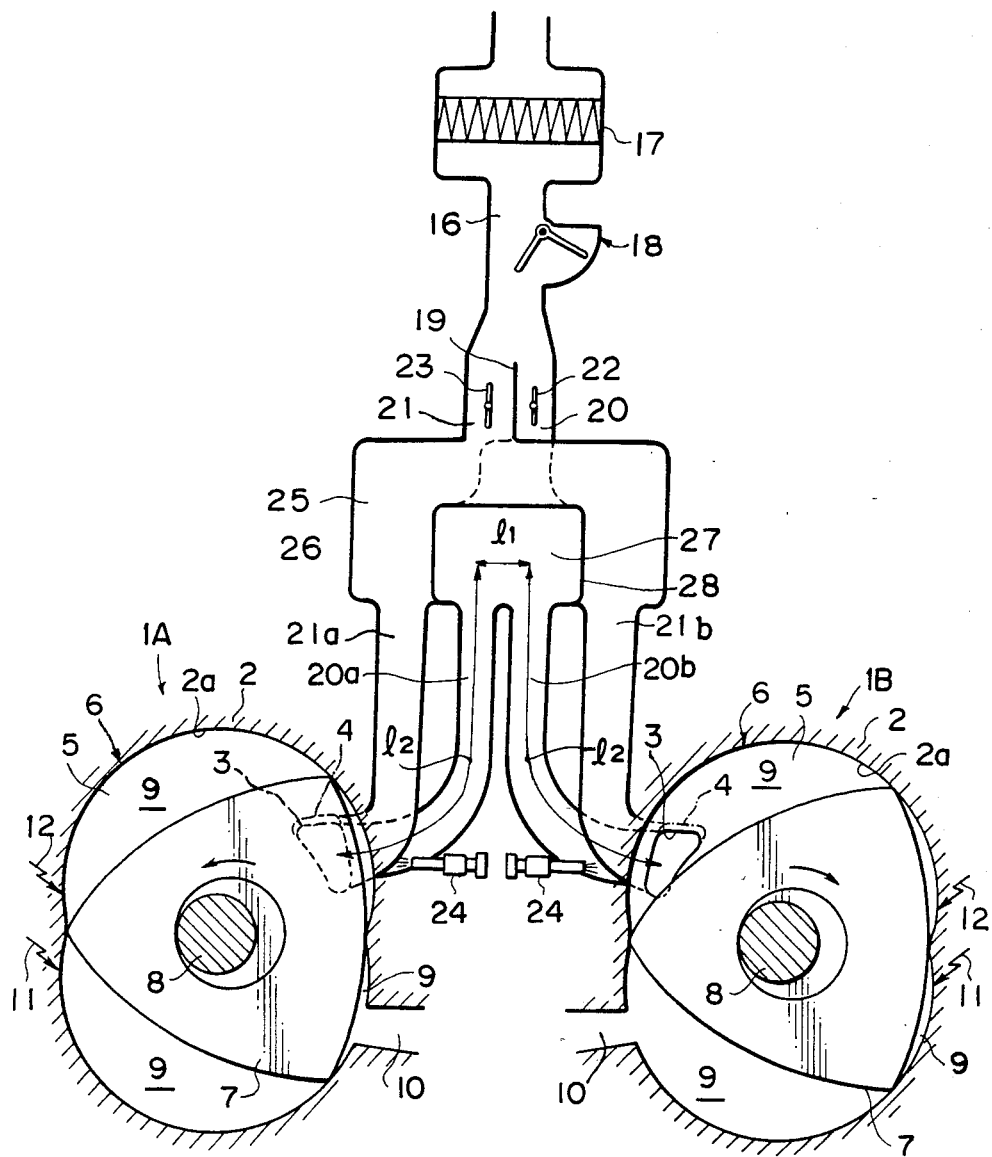
FIG. 1 is a diagrammatical illustration of a rotary piston engine in accordance with one embodiment of the present invention.
Figure 2:
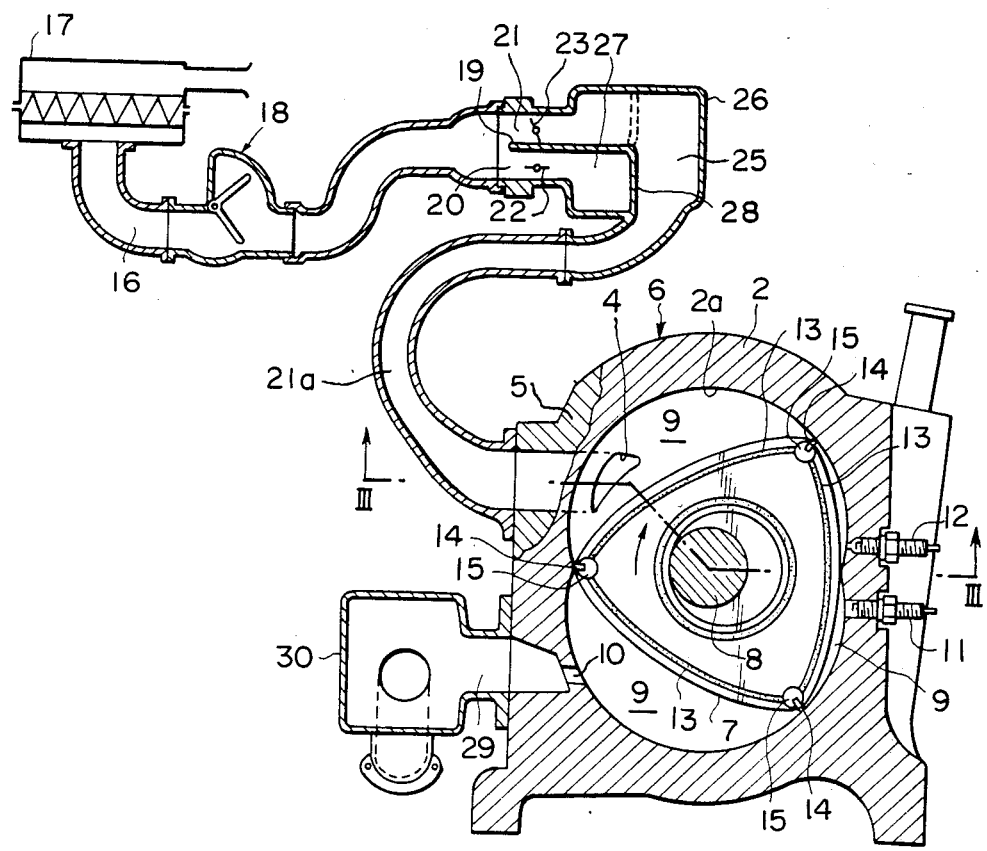
FIG. 2 is a sectional view of the engine shown in FIG. 1 showing the intake system employed in the engine.
Figure 3:
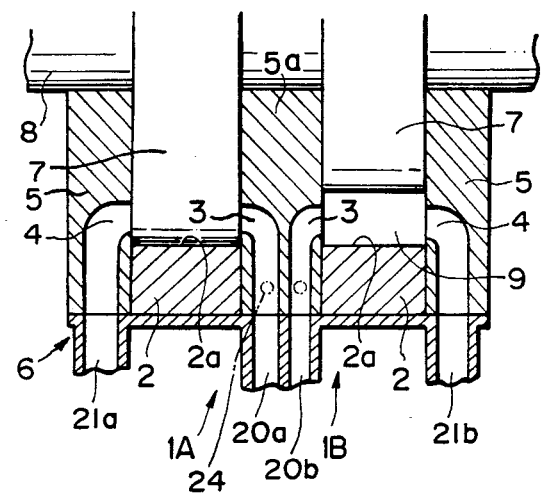
FIG. 3 is a sectional view taken substantially along the line III—III in FIG. 2.

Referring to the drawings, particularly to FIGS. 1 through 3, there is shown a two-rotor type rotary piston engine comprised of a pair of engine sections 1A and 1B. The engine sections 1A and 1B respectively have rotor housings 2 which are formed with inner walls 2a of trochoidal configuration. An intermediate housing 5a is located between the rotor housings 2 to separate them one from the other as shown in FIG. 3. The outer sides of the rotor housings 2 are attached with side housings 5 which are formed with intake ports 4. Thus, the rotor housings 2, the side housings 5 and the intermediate housing 5a constitute a casing 6 in which a pair of rotor cavities are defined. The intermediate housing 5a is formed with intake ports 3 respectively opening to the rotor cavities.

In each of the rotor cavities, there is disposed a rotor 7 of substantially triangular configuration. The rotors 7 are carried by an eccentric shaft 8 and have apex portions provided with apex seals 14 and corner seals 15. Further, the rotors 7 are provided at their side surfaces with side seals 13. The rotors 7 are rotatable with their apex seals 14 in sliding contact with the inner walls 2a of the rotor housings 2. The side seals 13 are maintained in sliding contact with the surfaces of the side housings 5 and the intermediate housing 5a. Thus, in each of the rotor cavities in the casing 6, there are defined working chambers 9 of which volumes cyclically changes as the rotor 7 rotates. The eccentric shaft 8 carried the rotors 7 with 180° phase difference between the rotors 7. The rotor housings 2 are formed with exhaust ports 10 and provided with ignition plugs 11 and 12. The exhaust port 10 is connected with an exhaust passage 29 leading to an exhaust manifold 30.

The intake system of the engine includes an air cleaner 17 connected with a common intake passage 16 provided with an air-flow detector 18. The common intake passage 16 leads to a primary intake passage 20 having a primary throttle valve 22 and a secondary intake passage 21 having a secondary throttle valve 23. The secondary throttle valve is interconnected with the primary throttle valve 22 so that the former is opened after the latter is substantially opened. The primary intake passage 20 is connected with a surge tank 28 which is in turn connected with a pair of individual intake passages 20a and 20b leading respectively to the intake ports 3 opening to the respective rotor cavities. The secondary intake passage 21 is connected with a surge tank 26 which is in turn connected with a pair of individual intake passages 21a and 21b leading respectively to the intake ports 4. In the vicinity of each intake port 3, the passages 20a and 20b are provided with fuel injecting nozzles 24. The secondary intake passage 21 has a cross-sectional area which is larger than that of the primary intake passage 20.

As well known in the art, the intake ports 3 and 4 are cyclically opened by the rotors 7. The opening period of each intake port 3 is 230° to 290° in terms of angle of rotation of the eccentric shaft 8 but that of each intake port 4 is 270° to 320°. Further, the intake ports 3 and 4 are located so that they are opened substantially simultaneously but the port 3 is closed earlier than the port 4. In FIG. 1, it will be noted that the individual intake passages 20a and 20b are located downstream the throttle valve 22 and have lengths $l_2$. Further, the openings of the individual intake passages 20a and 20b are spaced apart by a distance $l_1$ in terms of a center-to-center spacing. The surge tank 28 thus provides a communication passage 27 which is calculated by the formula $L = l_1 + 2l_2$ and this overall length is determined at a value between 0.34 and 1.47 m. Similarly, the surge tank 26 provides a communication passage 25 between the individual intake passages 21a and 21b and the overall length of the passages 21a, 21b and 25 is determined at a value between 0.57 and 1.37 m.

Figure 4:
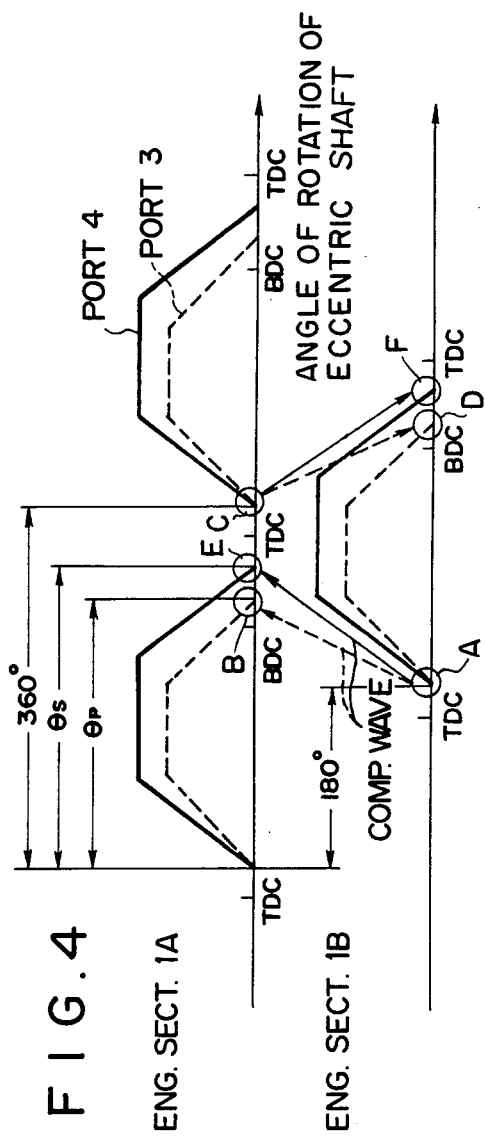
FIG. 4 is a diagram showing intake port timings in the engine shown in FIGS. 1 through 3.
Figure 5:
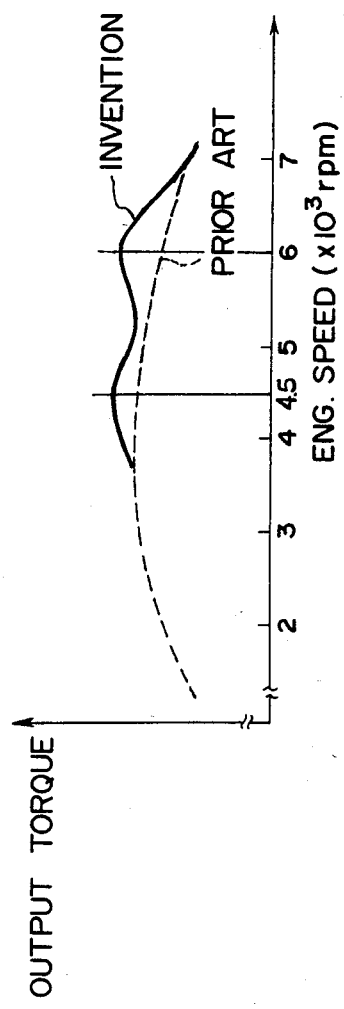
FIG. 5 is an engine output torque curve showing the improvement accomplished by the present invention.

Referring now to FIG. 4, the compression wave is produced at the intake ports 3 and 4 of one engine section, for example, the engine section 1B when the subject intake ports 3 and 4 are opened as shown at A. The compression wave is transmitted through the individual passages 20a, 20b and 21a, 21b and the communication passages 25 and 27 to the intake ports 3 and 4 of the other engine section, for example, the engine section 1A. Since the overall length L is determined as described previously, the compression wave reaches the intake port 3 in the said other engine section just before the subject intake port 3 is closed as shown by B under a medium engine speed. The compression wave functions to prevent blow-back of intake gas from the intake working chamber at the final stage of the intake stroke and provide an additional charge. Similarly, the compression wave produced at the intake port 3 of the engine section 1A as shown by C in FIG. 4 is transmitted to the intake port 3 of the engine section 1B just before the intake port 3 is closed as shown by D under a medium engine speed. Under a high engine speed, the compression wave produced at the intake port 3 as shown by A cannot reach the other port 3 before the other port 3 closes. However, in this instance, the compression wave at the intake port 4 is transmitted to the other intake port 4 as shown in E or F in FIG. 4 producing a similar pressure resonance effect. Thus, it is possible to obtain an increase in the engine output torque as shown in FIG. 5 by the full line curve in both of the medium and high speed engine operation. The speed at which the pressure resonance effect is obtained depends on the intake port timings and the overall length of the individual intake and communication passages. The port timings and the overall length are determined so that the desired effects can be obtained at a desired medium engine speed and a desired high speed. In the example shown in FIG. 5, the pressure resonance effects are obtained at 4500 rpm and 6000 rpm.

The invention is applicable not only to a fuel injection type engine as shown but also to a carburetor type engine although the application to a fuel injection type engine is more preferable than to a carburetor type engine.

The invention has thus been shown and described with reference to specific embodiments, however, it should be noted that the invention is in no way limited to the details of the illustrated structures but changes and modifications may be made without departing from the scope of the appended claims.

What is claimed is:

1. A two rotor type rotary piston engine comprising:
   a casing comprised of
      a pair of rotor housings, each rotor housing having an inner wall of trochoidal configuration,
      an intermediate housing located between the rotor housings, and a pair of side housing secured to outer sides of the respective rotor housings to define rotor cavities in the respective rotor housings, a pair of substantially polygonal rotors disposed in the respective rotor cavities with apex portions in sliding engagement with the inner walls of the respective rotor housings to define working chambers of cyclically variable volumes, eccentric shaft means carrying said rotors so that said rotors are rotated with 180° phase difference in terms of angle of rotation of said eccentric shaft means, intake means including two first intake port means provided in at least one of said intermediate and said side housings, each of said two first intake ports opening to one of the rotor cavities and being cyclically closed by said rotors as the rotors rotate, and two second intake port means provided in at least one of said intermediate and said side housings, each of said two second intake ports opening to one of the rotor cavities and being cyclically closed by said rotor as the rotor rotates, intake passage means including throttle valve means, said intake passage means including two first individual passage means leading respectively to said two first intake port means, first communicating passage means communicating with said two first individual passage means, two second individual passage means leading respectively to said two second intake port means, second communicating passage means communicating with said two second individual passage means, said first intake port means, said first individual passage means and said first communicating passage means having respectively port timings and passage lengths for transmitting a compression wave produced in one of said two first individual passage means in opening timing of one of said two first intake port means to the other of said two first intake port means just before said other of said two first intake port means is closed to obtain an additional intake charge under a first engine speed, said two second intake port means, said two second individual passage means and said second communicating passage means having respectively port timings and passage lengths for transmitting a compression wave produced in one of said two second individual passage means in opening timing of one of said two second intake port means to the other of said two second intake port means just before said other of said two second intake port means is closed to obtain an additional intake charge under a second engine speed which is different from said first engine speed by more than 1000 rpm.

2. A rotary piston engine in accordance with claim 1 in which said two first and said two second individual passage means and said first and said second communication passage means are provided downstream from the throttle valve means.

3. A rotary piston engine in accordance with claim 1 in which said throttle valve means includes first throttle valve means for controlling intake gas flow to said two first individual passage means and second throttle valve means for controlling intake gas flow to said two second individual passage means, the second throttle valve means being opened after the first throttle valve means is substantially fully opened, the second engine speed being higher than said first engine speed.

4. A rotary piston in accordance with claim 3 in which the two first intake port means have an opening period of 230° to 290° in terms of angle of rotation of the eccentric shaft means, the two second port means having an opening period of 270° to 320° in terms of angle of rotation of the eccentric shaft means, the two first individual passage means and said first communicating passage means having an overall length of 0.34 to 1.47 m, the two second individual passage means and said first communicating passage means having an overall length of 0.57 to 1.37 m.

5. A rotary piston engine in accordance with claim 3 further comprising air-flow detecting means for detecting airflow through said intake passage means, fuel injection nozzle means provided in said two first individual passage means for injecting fuel in accordance with the airflow detected by the airflow detecting means.

6. A rotary piston engine in accordance with claim 4 wherein said two second intake port means have an opening period greater than that of the two first intake port means.

7. A rotary piston engine in accordance with claim 3 wherein said two first and said two second intake port means have substantially the same opening timing, the two first intake port means having a closing timing which is earlier than the two second intake means.

* * * * *